Dec. 23, 1969 B. KAZAN 3,485,621

RECORDING BY PARTICLE ORIENTATION

Filed April 4, 1966

INVENTORS:
BENJAMIN KAZAN

BY: Stanley Z. Cole
Stefan J. Klauber
ATTORNEY:

United States Patent Office 3,485,621
Patented Dec. 23, 1969

3,485,621
RECORDING BY PARTICLE ORIENTATION
Benjamin Kazan, Pasadena, Calif., assignor to Xerox Corporation, Rochester, N.Y., a corporation of New York
Continuation-in-part of application Ser. No. 387,080, Aug. 3, 1964. This application Apr. 4, 1966, Ser. No. 539,778
Int. Cl. G03g *5/00;* G11b *5/62*
U.S. Cl. 96—1 5 Claims

ABSTRACT OF THE DISCLOSURE

This application relates to a recording method wherein plate-like diamagnetic anisotropic particles selected from the group consisting of colloidal graphite, naphthalene, anthacene and p-terphenyl are dispersed in a thermoplastic layer, selectively oriented by application of an electrostatic field transverse to said layer while said layer is held in a softened condition and said layer is hardened whereby the particles are oriented in accordance with said electrostatic field.

This application is a continuation-in-part of my copending application, Ser. No. 387,080, filed Aug. 3, 1964 and now abandoned.

In general, the present invention invloves a method and means for recording data in the form of electrical or optical data. More particularly, the present invention involves both method and means for permanently recording data while permitting such recorded data to be easily read or erased without the consumption of material.

In recent years there has been widespread and intensive research and development efforts on the problem of simply and yet permanently recording data, such as a printed or written page or a picture, either in electrical or optical form, while permitting such data, when recorded, to be easily read or erased. Preferably, direct recording of the data and its erasure should not involve the consumption of materials so that the recording medium could be conveniently reused. To date, a number of systems have been developed wherein the data is recorded as a deformation pattern on the surface of a thermoplastic film and then the information recorded on such film is read by an optical system such as the Schlieren system. One example of such prior art system is described and disclosed in the Boldebuch U.S. Patent No. 3,063,872 dated Nov. 13, 1962. As described therein, technical data and photographic images are first converted electronically into coded singals which are further reduced to variations in the intensity of a beam of electrons. The electron beam is then used to scan the surface of thermoplastic film and introduce onto this surface an electrostatic charge pattern which is then converted into a pattern of impressions which can be observed optically. Another system which has been developed is described in the Dreyfoos U.S. Patent No. 3,055,006 issued Sept. 18, 1962, wherein optical data such as graphic or pictorial data is recorded by photoconductivily establishing a charge pattern on a thermoplastic film with an optical image and converting the modulated charge pattern into a pattern of ripples on the surface of the thermoplastic film. The Dreyfoos system includes two layers one of which is a transparent dielectric material while the second is a thin photoconductive material. Still another system is described in the Gundlach et al. article in Photographic Science and Engineering, volume VII, No. 1, January–February, 1963, pp. 14–19, wherein a thermoplastic overcoating on a photoconductive film on a conducting substrate is used to produce a surface deformation pattern which can later be reproduced by an optical system.

From the foregoing brief discussion it can be seen that the present systems which have been developed for data recording utilizing an electrostatic charge pattern have been limited to a recording film having the information stored thereon by surface deformation pattern. Such recording means have the obvious disadvantage that the deformation pattern is subject to adverse external factors such as mechanical abuse or destruction of the exposed microscopic surface deformations. Another disadvantage of such recording film carrying a surface pattern is that it cannot be read directly by any convenient electrical method.

Consequently, the object of the present invention is a film adapted to permanently record either electrical or optical data while permitting such recoded data to be easily read or erased without the consumption of material.

Still another object of the present invention is that the film is adapted to permanently record data by electrostatic techniques while protecting the data from external abuse.

Still another object of the present invention is a film adapted to permanently record data by electrostatic techniques and then permit such data to be read by magnetic or electrical means.

Still another object of the present invention is a method of recording, permanently, data by an electrostatic technique.

Still another object of the present invention is a method for permanently recording data by an electrostatic technique and then reading said data by magnetic or electrical means.

Other objects and advantages of the present invention will be readily apparent from the following description and drawing which illustrate a preferred exemplary embodiment of the present invention.

In general, the present invention involves a method and means for permanently recording either electrical or optical data while permitting such data to be easily read or erased. Such method and means involve forming a thermoplastic sheet having a dispersion of fine particles embedded therein in a fixed pattern of angles to a surface of said sheet such as the top surface or edge corresponding to the data to be recorded. Such sheet may be bonded either permanently or temporarily to an electrically conductive support sheet. In the case of optical data, an additional photoconductive sheet can be used which is adapted to receive optical data thereon and convert the optical data into an electrostatic charge pattern on the thermoplastic sheet.

In order to facilitate understanding of the present invention, reference will now be made to the appended drawings of a preferred specific embodiment of the present invention. Such drawings should not be construed as limiting the invention which is practically set forth in the appended claims.

In the drawings:

FIG. 2(*b*) is similar to FIG. 2(*a*) except an electron beam applies the electrostatic charge pattern.

Figure 1:
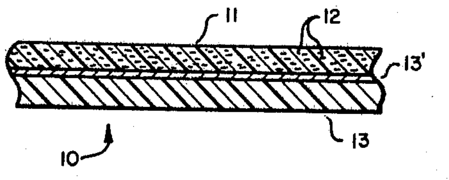
FIG. 1 is a schematic side view of the specific embodiment of the film of the present invention.

As illustrated in FIG. 1, the film 10 of the present invention involves a thermoplastic sheet 11 which is adapted to have an electrostatic charge pattern formed on its surface corresponding to the data to be recorded. Embedded in the thermoplastic sheet 11 is a dispersion of fine particles 12 which are adapted to align themselves with the electrostatic fields set up by the electrostatic charge pattern on the thermoplastic sheet 11 in proportion to the strength of such electrostatic field when the sheet 11 is heated to a softened condition for a predetermined time period. Adjacent to the thermoplastic sheet 11 is a support sheet 13 whose surface has a metallic layer 13' enabling an electrostatic field to be produced in the thermoplastic sheet 11 between its surface electrostatic charges and layer 13'.

Figure 2A:
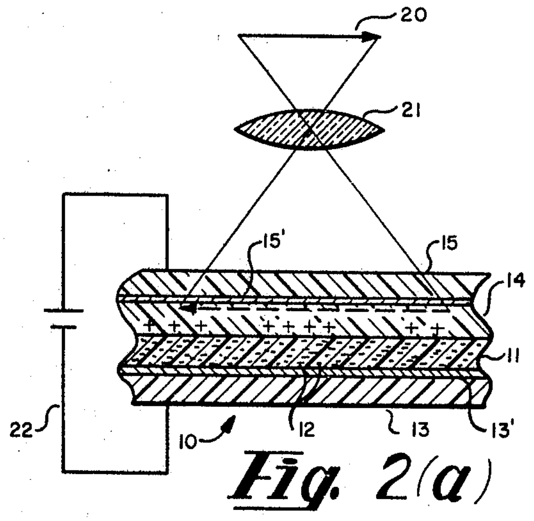
FIG. 2(*a*) is a schematic view of the film of the present invention and one step in a specific embodiment of the method of the present invention wherein the electrostatic charge pattern is applied by means of a photoconductive sheet.
Figure 2B:
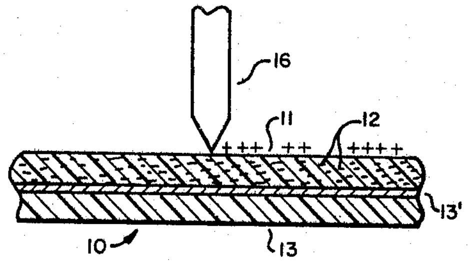

As illustrated in FIG. 2(*a*), the film 10 may also include a photoconductive sheet 14 contacting the thermoplastic sheet 11 with such photoconductive sheet 14 being adapted to receive optical data thereon and convert the optical data into an electrostatic charge pattern on the thermoplastic sheet 11. The photoconductive sheet 14 as shown is provided with a contacting transparent conductive sheet 15' which may be mounted on the support sheet 15. The photoconductive sheet 14 can be used to lay down an electrostatic charge pattern on the thermoplastic sheet 11 following which the photoconductor may be separated from the thermoplastic sheet 11. If the thermoplastic layer is conductive, the photoconductor may be maintained in contact with the thermoplastic layer with the electric field and optical input image also maintained while the thermoplastic layer is heated to allow particle orientation. Alternately, as shown in FIG. 2(*b*), the electrostatic charge pattern may be provided by a scanning electron beam 16 or by imaging a pattern of electron currents on the surface in accordance with conventional techniques used in charge-storage tubes.

Both the thermoplastic sheet 11 and the particles 12 may be composed of a wide variety of materials so long as the essential requirement be met that the particles align themselves with an electrostatic field set up in the softened thermoplastic sheet within the predetermined time period. The rate at which the particles are oriented by an applied electrostatic field in the thermoplastic sheet is dependent upon such factors as the shape, conductivity and dielectric constant of the particles, as well as the viscosity of the thermoplastic sheet and its dielectric constant. An analysis of a somewhat related system involving the orientation of small conducting particles suspended in a fluid, rather than a thermoplastic medium and subjected to an electrostatic field is given by Donal and Langmuir in the Proceedings of the Institute of Radio Engineers, May 1943, pp. 208–214. According to the present disclosure the particles may have a substantially needle shape or plate shape and preferably have magnetic properties such as a substantial coercive force and remanence or a substantial permeability when magnetic reading techniques are to be used. A specific example of magnetic particle material is the iron oxide material which is presently used on magnetic tapes used for recording of electrical signals. In addition, or alternately, particles may have substantial conductance where electrical reading techniques are to be employed. In another variation particles may exhibit high light occluding properties where optical read-in and read-out techniques are to be employed. Dispersions of plate-like particles of colloidal graphite are an excellent example of this latter type of material. The thermoplastic sheet in which the particles are embedded may be composed of material such as polystyrene, polyethylene, or paraffin, or the thermoplastic compositions mentioned by the Boldebuck patent, supra. The support sheet 13 may be formed out of metal or, preferably, high melting, transparent insulating materials such as Mylar which has a conductive coating 13' adjoining the thermoplastic sheet. The photoconductive sheet may be made of a conventional photoconductive material such as selenium.

The method of the present invention involves forming a thermoplastic sheet having a dispersion of fine particles embedded therein in a fixed pattern of angles through the surface of the sheet corresponding to the data to be recorded. More particularly, the method involves first forming a thermoplastic sheet having a dispersion of fine particles embedded therein initially oriented either randomly or in a preferred direction. Then, an electrostatic charge pattern is formed on the surface corresponding to the optical data to be recorded. The sheet is then heated to a softened condition for a predetermined time period while maintaining the local areas of the sheet in the electrostatic field and conforming to the electrostatic charge pattern. Such a step causes the particles to change their angular position, forming a pattern of angles to the surface of the sheet corresponding to the charge pattern or the optical data being recorded. Finally, the thermoplastic sheet is cooled so that the pattern of particle orientation is fixed permanently.

One method of forming the electrostatic charge pattern on the surface of the sheet 11 is illustrated in FIG. 2(*a*) wherein a composite film 10 is formed with a photoconductive sheet 14 adjoining the thermoplastic sheet 11. The optical information 20 is then projected through a lens system 21 and focused on the photoconductive layer 14 while an electrical circuit 22 applies an electrical potential across the composite film. The optical image on the photoconductive sheet allows a pattern of currents to leak through the photoconductive sheet and build up a charge on the thermoplastic film 11 which will retain such surface charge pattern when separated from the photoconductive sheet 14. If the conductivity of the thermoplastic layer is too high, it may be maintained in contact with the optically exposed photoconductor during heating of the thermoplastic layer. Another method involves the use of an electron beam 16 to directly place an electrostatic charge as shown in FIG. 2(*b*). With such arrangement use can be made of secondary emission techniques commonly used in storage tubes, employing a scanning beam whose current is modulated in accordance with the input signal.

Figure 3:
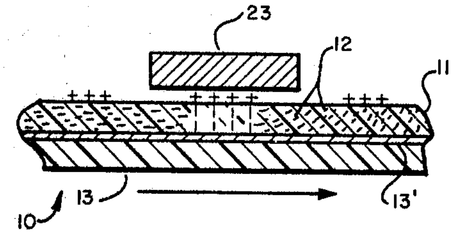
FIG. 3 is a schematic view of another step of the present invention wherein the film is heated with the electrostatic charge pattern thereon.

After the electrostatic charge pattern is deposited on the film 10, it is passed adjacent to a heater 23 such as an induction heater as illustrated in FIG. 3. The thermoplastic sheet 11 is heated to a softened condition for a predetermined time period so that the electrostatic field set up by the electrostatic charge pattern causes the particles to form a pattern of angles corresponding to the optical data. The sheet is then cooled so that such pattern becomes fixed whereby a permanent record is formed which can be easily read or erased without the consumption of material.

Figure 4:
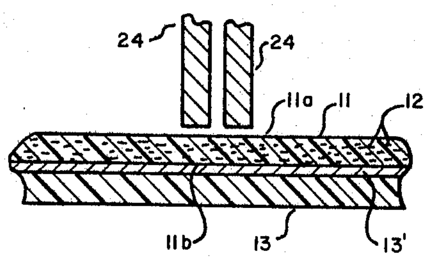
FIG. 4 is a schematic representation of the reading of the optical data recorded on the film by means of a magnetic reading device.

As illustrated in FIG. 4, one method of reading the tape involves forming a magnetic field by means of poles 24 wherein the magnetic path extends through the sheet 11. For example, where a conductive support sheet 13 is used, the magnetic path may extend from the first surface **11*a* of the thermoplastic sheet 11 to the opposite, second surface 11*b*, of the thermoplastic sheet 11, and back to the first surface 11*a* of the thermoplastic sheet 11. When the thermoplastic sheet 11 is passed by the poles 24**, the variations in magnetic reluctance due to the variation in particle angular orientation are sensed by the magnetic reading means as corresponding variations in electric current output.

Another method of sensing or reading the pattern of angles of the particles as a result of recording involves first subjecting the film to a uniform magnetic field to magnetize the particles (having substantial remanence) in one direction, for example, parallel to the surface of the sheet. As a result of this, the remanent magnetic field stored in successive portions of the sheet will vary in accordance with the orientation of the particles with respect to the surface or their orientation with respect to the direction of the previous magnetizing field. Reading may then be accomplished by moving the sheet past a magnetic reading means adapted to produce electrical current output variations corresponding to the local variations in the magnetic field at the surface of the tape.

Still another method for reading the pattern of particle angles is to transmit light from a predetermined light source through the sheet. If the light is in the form of a fine spot which is moved relative to the tape, a modulated output light intensity will result on the opposite side of the tape, which can be converted to time-varying electrical signals by means of a photocell. Alternatively, a relatively broad beam of light incident on the sheet will result in a pattern of transmitted light which can be viewed directly or imaged onto a screen. Still other means of reading the pattern of particle angles are the sensing of the variation in conductance or capacitance of elemental areas of said sheet between adjoining surface portions of said sheet by conventional apparatus. In such situation, if the conductive path is through the sheet substantially perpendicular to its surface, then the conductance is substantially higher when the particles are aligned perpendicular to the surface of the sheet as compared to a random alignment or an alignment parallel to the sheet surface. Alternatively, if the sensing conductive path is parallel to the sheet surface, alignment of the particles parallel to the sheet surface provides the highest conductive path. Similar considerations apply to the measurement of the capacitance of various paths through the sheet. An apparatus similar to that shown in FIG. 4 could be used to read either the conductance or capacitance of the paths through the sheet parallel to the surface or a single electrode may be used in conjunction with a conducting support sheet such as sheet 13 to read variations in conductivity or capacitance in a direction perpendicular to the sheet.

Preferably, the electrical reading of the conductance or capacitance may be accomplished by scanning the surface with an electron beam which senses the potential variations due to variations for target resistance as in the vidicon, or the constant-current beam may build up a pattern of potential variation due to capacity variations on the surface, and these voltage variations subsequently read out by the scanning beam.

Figure 5:
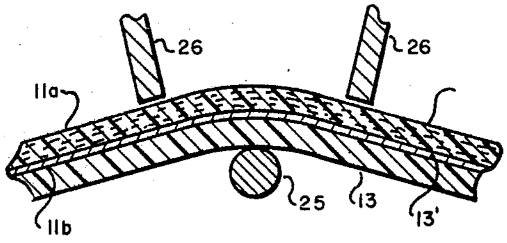
FIG. 5 is a schematic representation of the erasing of the optical data recorded on the film by means of a magnetic device.

Erasure of the data from the thermoplastic sheet may be done by any suitable means. For example, erasure may be done simply by reheating the plastic sheet to a softening point while applying an external magnetic field in a fixed direction relative to the sheet surface. Thus, an apparatus such as illustrated in FIG. 5 wherein a heated roller 25 forces the sheet 11 to pass between widely separated poles 26. With such an arrangement particles become oriented parallel to the surface of the sheet and are frozen in such position. Alternatively, erasure of the recorded data may be done by other means such as vibration of the heat sheet which may produce a random orientation of the particles. The sheet can then be used again for recording more data by reorienting the particles in a selected pattern.

The magnetic erasure technique depicted in FIG. 5—aside from its utilization with particles displaying substantial remanence—may be utilized in other instances where the dispersed particles exhibit characteristics enabling magnetic orientation or disorientation. A particularly interesting case occurs where the particles are a member of a class of crystals with layer-like lattices exhibiting marked anisotropy in diamagnetic susceptibility—an immediately pertinent example being colloidal graphite. Dispersed particles of the latter material are plate-like in structure and possess high light occluding properties, both characteristics serving to ideally suit such materials to recording—and particularly to recording of optical images—in accord with the present invention. In fact, it was this very species of particle for which the analysis of Donal and Langmuir, op. cit., was performed. See too in this connection U.S. Patent No. 2,290,581 to J. S. Donal describing an image amplifier employing a dispersion of such particles. In the present invention it has been found further, however, that in addition to their well known imaging properties advantage may be taken of their aforementioned diamagnetic anisotropic properties to enable rapid erasure of optical images formed therefrom by mere application of a magnetic field in a direction transverse to that of their exhibited increased diamagnetic susceptibility. In the case of colloidal graphite particles the abnormal increase in such susceptibility is in a direction normal to the plate-like structure. Accordingly such particles will when placed in a strong magnetic field tend to align with their long axis parallel to the field. Thus, in FIG. 5 if the dispersed particles 12 comprise colloidal graphite application of the magnetic field between poles 26 will serve as illustrated to re-align the particles in a direction parallel to the layer surface thereby readying the film for re-imaging in accord with FIGS. 1 to 3.

Other crystalline particles exhibiting diamagnetic anisotropy may be similiarly employed in connection with the present invention to facilitate erasure and subsequent re-imaging, although in some instances the light modifying characteristics of these other materials may not be as advantageous as those of the preferred colloidal graphite. For example, plate-like particles of aromatic compounds such as napthalene, anthracene, and p-terphenyl exhibit the desired characteristics.

It will also be evident to those skilled in the art that where the magnetic erasure technique discussed in connection with FIG. 5 is employed, the same or additional pole pieces may be positioned elsewhere with respect to the film in order to achieve varying or more random disorientation. As the film 13' may be chosen to possess low permeability, additional pole pieces may, for example, be placed on alternate sides of the film 10 so as to establish a second magnetic field transverse to the film plane. This second field may furthermore be alternated with application of the first field (that established by poles 26) so as to effect relatively random orientation of the dispersed magnetic field-responsive particles.

Many other specific embodiments of the present invention will be obvious to one skilled in the art in view of this disclosure. Thus, for example, a variety of methods and means have already been set forth above. In addition, electrostatic charge patterns under certain conditions may leak off rapidly due to the increased conductivity caused by heating of the plastic. Under such conditions, the alignment of the particles may be done while the thermoplastic layer sheet is maintained in contact with the photoconductive sheet.

There are many features in the present invention which clearly show the significant advance the present invention represents over the prior art. Consequently, only a few of the more outstanding features will be pointed out to illustrate the unexpected and unusual results obtained by the present invention. One feature of the present invention is that the recording medium, i.e., the thermoplastic sheet, completely encapsulates the particles embedded therein and protects them from external abuse so that the data recorded thereby can be easily stored and handled. Still another feature of the present invention is that after the thermoplastic sheet has cooled, the pattern of particle orientation angles is fixed so that a permanent record of the data is obtained. Still another feature of the present invention is the use of particles having substantial coercive force and remanence or substantial permeability so that the pattern recorded in the thermoplastic sheet may be read by magnetic means. Similarly, particles may be chosen for their electrical characteristics of capacitance or conductance so that the data may also be read by electrical means. Finally, particles may also be utilized simply to record the data and permit the reading of the data simply by optical means or simultaneously by optical means and magnetic or electrical means.

It will be understood that the foregoing description and examples are only illustrative of the present invention and it is not intended that the invention be limited thereto. All substitutions, alterations, and modifications of the present invention which come within the scope of the following claims or to which the present invention is readily suscepible without departing from the spirit and scope of this disclosure are considered part of the present invention.

What is claimed is:

1. A method for recording optical images in a form suitable for preservation or for subsequent erasure comprising:

(a) dispersing plate-like diamagnetically anisotropic particles selected from the group consisting of colloidal graphite, naphthalene, anthracene, and p-terphenyl in a thermoplastic layer, said particles being adapted to orient in an electric field with the longitudinal plane of said plate-like particles parallel to said field, said particles being further characterized as exhibiting increased diamagnetic susceptibility in a direction transverse to the plane of said plate-like particles whereby erasure of images recorded therewith may be effected by applying disorienting magnetic fields to said particles when said layer is in a softened condition;

(b) selectively orienting said particles by applying for a predetermined period of time and while said layer is in a softened condition an electrostatic field transverse to said layer, said field varying in intensity at points on said layer in accord with said electrostatic field, whereby the opacity of said layer to transmitted light is made to vary in accord with said electrostatic field; and (c) hardening said layer.

2. A method according to claim 1 wherein said particles comprise colloidal graphite.

3. A method for recording and subsequently erasing optical images on a reusable film comprising in sequence the steps of (a) forming a composite film including a thermoplastic sheet and an adjoining photoconductive sheet, said thermoplastic sheet having a dispersion of diamagnetically anisotropic plate-like particles embedded therein, said particles being adapted to align with an electrostatic field set up in said thermoplastic sheet in accordance with the intensity of said field when said sheet is heated to a softened condition for a predetermined time period;

(b) exposing said film to an optical image to be recorded while applying an electrostatic potential across said film to form an electrostatic charge pattern thereon corresponding to said optical image, (c) heating said thermoplastic sheet to a softened condition for said predetermined time period while maintaining in said thermoplastic sheet an electrostatic field conforming to said electrostatic charge pattern, whereby said plate-like particles align with said field in accord with the intensity pattern of said field to form an image pattern in said sheet corresponding to said optical image;

(d) cooling said thermoplastic sheet to enable utilization of the recorded image; and (e) heating said thermoplastic sheet to a softened condition while applying a magnetic field in the vicinity of said particles in a direction parallel to that in which previously aligned particles exhibit increased diamagnetic susceptibility, whereby said particles may be rotated to erase said recorded optical image.

4. A method according to claim 3 wherein said particles comprise colloidal graphite.

5. A reusable imaging member comprising a thermoplastic sheet adapted to have an electrostatic charge pattern formed thereon corresponding to information to be recorded, a dispersion of plate-shaped colloidal graphite particles being embedded in said sheet, said particles being adapted to align with the electrostatic field set up by said charge pattern in accordance with the intensity of said electrostatic field when said sheet is heated to a softened condition for a predetermined time period, said particles being further chosen to display diamagnetic anisotropy whereby erasure of said recorded images may be effected through application of magnetic fields while said sheet is in a softened condition.

References Cited

UNITED STATES PATENTS

| | | | |
|---|---|---|---|
| 2,857,290 | 10/1958 | Bolton | 95—1.7 X |
| 2,949,848 | 8/1960 | Mott | 96—1.5 X |
| 3,215,528 | 11/1965 | Schaum et al. | 96—1.5 |
| 3,171,106 | 2/1965 | Lemmond | 340—174.1 |
| 3,287,120 | 11/1966 | Hoegl | 96—1.5 |
| 3,268,361 | 8/1966 | Gaynor | 96—1.1 X |
| 3,283,309 | 11/1966 | Gaynor | 96—1.1 X |
| 3,308,234 | 3/1967 | Bear | 96—1.1 X |
| 3,308,444 | 3/1967 | Ting | 96—1.1 X |

GEORGE F. LESMES, Primary Examiner

C. E. VAN HORN, Assistant Examiner

U.S. Cl. X.R.

178—6.6; 340—173, 174.1; 346—74